United States Patent [19]

Haruta et al.

[11] Patent Number: 5,258,994
[45] Date of Patent: Nov. 2, 1993

[54] DISCHARGE-EXCITED LASER APPARATUS

[75] Inventors: Kenyu Haruta; Akihiro Suzuki; Akihiko Iwata; Yasushi Minamitani; Hitoshi Wakata; Tomohiro Sasagawa; Takashi Kumagai, all of Hyogo, Japan

[73] Assignee: Mitsubishi Denki K.K., Tokyo, Japan

[21] Appl. No.: 718,534

[22] Filed: Jun. 19, 1991

[30] Foreign Application Priority Data

| Jun. 20, 1990 | [JP] | Japan | 2-163228 |
| Jul. 9, 1990 | [JP] | Japan | 2-179457 |
| Aug. 15, 1990 | [JP] | Japan | 2-214402 |
| Nov. 9, 1990 | [JP] | Japan | 2-305208 |
| Nov. 9, 1990 | [JP] | Japan | 2-305212 |
| Nov. 9, 1990 | [JP] | Japan | 2-305213 |

[51] Int. Cl.⁵ .................................................. H01S 3/097
[52] U.S. Cl. .................................... 372/82; 372/69; 372/61
[58] Field of Search ............... 372/86, 87, 69, 88, 372/93, 98, 61

[56] References Cited

U.S. PATENT DOCUMENTS

| 4,223,279 | 2/1980 | Bradford, Jr. et al. | 372/86 |
| 4,635,267 | 1/1987 | Cirkel et al. | |
| 4,691,322 | 9/1987 | Nozue et al. | 372/82 |
| 4,709,373 | 11/1987 | Scott et al. | 372/86 |
| 5,050,178 | 9/1991 | Brückner et al. | 372/87 |

FOREIGN PATENT DOCUMENTS

1296078 11/1972 United Kingdom .
1170038 7/1986 United Kingdom .

OTHER PUBLICATIONS

"Pulsed $CO_2$ Laser Pumped by an All Solid-State Magnetic Exciter," T. Shimada, K. Noda, M. Obara and K. Midorikawa, *Japanese Journal of Applied Physics*, vol. 24, No. 11, Nov. 1985, pp. L855-L887.

*Primary Examiner*—Léon Scott, Jr.
*Attorney, Agent, or Firm*—Sughrue Mion Zinn Macpeak & Seas

[57] ABSTRACT

A discharge-excited laser apparatus includes a pair of discharge electrodes extending in a direction of an optical axis; a plurality of charging capacitors charged by a power source; a plurality of peaking capacitors arranged in parallel in a longitudinal direction of the discharge electrodes and receiving energy accumulated in the charging capacitors; and a plurality of semiconductor switches arranged with conductive plates in the longitudinal direction of the discharge electrodes and connected in series and in parallel to the peaking capacitors. The construction of the semiconductor switches enables uniform shift of the energy in the charging capacitors to the peaking capacitors and reduction of inductance of a loop for capacity shifting.

9 Claims, 14 Drawing Sheets

DISCHARGE-EXCITED LASER APPARATUS

BACKGROUND OF THE INVENTION

The present invention relates to a discharge-excited laser apparatus, and more particularly to a switch for the discharge-excited gas laser apparatus.

FIG. 1 illustrates a conventional high-voltage switch using a thyratron for a discharge-excited gas laser apparatus, which is for example, shown in a EMG50E product catalogue issued by Lambda Physics Inc. In this Figure, reference number 7 indicates a thyratron, which is a high-voltage switch. Reference number 4 indicate capacitors charged up to a high voltage, which are arranged side by side in a large number in parallel connection. The terminal of the thyratron 7 at a high-voltage switch side and the capacitors 4 are connected with a conductive plate 10. A conductive container 8 for accommodating the thyratron 7 therein is connected with the low-voltage terminal of the thyratron 7. A lid 9 of the thyratron container 8 is made of an insulating material in order to maintain insulation between the terminals of the thyratron 7. A lower conductive plate 6 is connected to the capacitors 4 in parallel. Peaking capacitors 15 of a capacity shifting circuit are connected in parallel in a large number to both sides of the lower conductive plate 6. Reference number 17 indicates a conductive plate, which forms a capacity shifting loop with 4-10-7-8-17-15-6-4. A pair of mutually opposing discharge electrodes 16, which extend in the direction of an optical axis, are respectively installed on the lower conductive plate 6 and the conductive plate 17. The high-voltage switch shown in FIG. 1 is expressed as shown in FIG. 2 in terms of an electrical circuit diagram. This circuit forms the capacity shifting circuit. However, FIG. 1 does not show reactors 13 and 14 and a high-voltage power source 11.

Next, the operations of the high-voltage switch will be described. The switch shown in FIG. 1 is equivalent to the electrical circuit diagram shown in FIG. 2. In this case, the high-voltage switch 12 corresponds to the thyratron 7. The operations in FIG. 2 are such that electric charge is accumulated in the charging capacitor 4 from a high-voltage power source 11 via the charging reactors 13 and 14, and, when the switch 12 is closed thereafter, the electric charge in the capacitor 4 shifts to the peaking capacitor 15. When electric charge is built up in the peaking capacitor 15, the electric charge is promptly fed to the laser discharge electrodes 16. Thus, in FIG. 1 in which the thyratron 7 corresponds to the high-voltage switch 12, the electric charge charged in the charging capacitor 4 is shifted to the peaking capacitor 15 via the loop formed of 4-10-7-8-17-15-6, when ignition occurs in the thyratron. As a result, the voltage between the electrodes 16 rises sharply, and, as the discharge space between the electrodes breaks down, the energy in the peaking capacitors 15 is put into the discharge field. Thus, the gas in the discharge space is excited, and the stimulated emission produces a laser beam.

The above described conventional high-voltage switch for a discharge-excited laser has had the problems that it fails to transmit the electric charge in any uniform manner, since the electric charge will be in a coaxial form in the thyratron part because of the shape of the thyratron, even if the charging capacitors are arranged in parallel in the longitudinal direction of the electrodes to put the electric charge uniformly in the longitudinal direction to the electrodes, so that the high-voltage switch fails to transmit the electric charge accumulated in the charging capacitors as it is in its form of arrangement to the peaking capacitor, and eventually fails to charge the peaking capacitor uniformly and fails to feed any electric charge uniformly in the longitudinal direction of the electrodes into the discharge field. Therefore, the voltage in the peaking capacitors lacks for uniformity in the longitudinal direction of the electrodes and also the discharge in the longitudinal direction of the electrodes shows a lack of uniformity, so that the laser generating efficiency declines.

By the way, the rise-up velocity $dv/dt$ of voltage between the discharge electrodes will be higher as the shifting velocity in the above-mentioned shifting loop increases. It is known that more stable discharge will be obtained in, for example, an excimer laser, when the above-mentioned $dv/dt$ value increases. Therefore, it is a usual practice to arrange the charging capacitors 4 and the peaking capacitors 15 in parallel with the direction of the optical axis in relation to the discharge electrodes 16, thereby forming a construction which can achieve a reduction of a stray inductance to the maximum extent possible. However, if a thyratron is used as a high-voltage switch as in the conventional switch, the electric current converges in the thyraton part in the shifting loop, and, consequently, the overall inductance of the shifting loop cannot be reduced to any level lower than 200 nH (of which 100 to 150 nH is in the thyratron part).

Moreover, as a thyratron is sensitive to changes in temperature, it also has had such short-comings as the requirement of a preheating time at the start-up of an apparatus and the necessity of strict temperature control.

SUMMARY OF THE INVENTION

The present invention has been made with a view to overcoming the problems described above.

An object of the present invention is to provide a discharge-excited laser apparatus including a high-voltage switch which is capable of generating discharge uniformly in the longitudinal direction of discharge electrodes by transmitting the electric charge accumulated in charging capacitors arranged in the longitudinal direction of the electrodes to peaking capacitors uniformly in the longitudinal direction of the electrodes without deforming the shape of arrangement of the charge.

Another object of the present invention is to provide a simple and highly reliable discharge-excited laser apparatus which is capable of forming a shifting loop with a low inductance, thereby attaining a high rising velocity of voltage $dv/dt$ and achieving high stability and uniformity in the discharge, and does not require any strict temperature control.

A discharge-excited laser apparatus according to a first aspect of the present invention is provided with a high-voltage switch which is made of, instead of a thyratron, such semiconductor switches as FET connected in a large number in series and in parallel, so that they can withstand a high voltage and a large current, and arranged in a plane configuration in the longitudinal direction of discharge electrodes. The high-voltage switch transmits the electric charge accumulated in capacitors to the subsequent stage capacitors uniformly in the longitudinal direction of the electrodes by turning all the FETs on at the same time. Moreover, as the switches (FETs) are arranged in parallel, the inductance of a loop for capacity shifting will be smaller than that in the case of a thyratron. As the result, sharp current pulses can be applied to the discharge electrodes.

A discharge-excited laser apparatus according to a second aspect of the present invention uses a plural number of solid switching elements as a high-voltage switch, which are arranged on both sides in relation to a virtual line drawn in such a manner as to pass through a pair of discharge electrodes as viewed in a section crossing the optical axis of laser beam at a right angle. The discharge-excited laser apparatus is capable of reducing the inductance in a capacity shifting loop and producing a high rising velocity dv/dt of voltage effective for generating stable and uniform discharge. Furthermore, the laser apparatus does not require any strict temperature control and therefore offers high reliability.

A discharge-excited laser apparatus according to a third aspect of the present invention has a switch block composed of a plural number of switches and conductive plates, which are arranged on a virtual line drawn in such a manner as to pass through a pair of discharge electrodes as viewed in a section crossing the optical axis of the laser beam at a right angle. The discharge-excited laser apparatus is capable of reducing the inductance in a capacity shifting loop and producing a high rising velocity dv/dt of voltage between the electrodes.

A discharge-excited laser apparatus according to a fourth aspect of the present invention is provided with a switch unit for releasing the energy accumulated in charging capacitors (pulse generating capacitors), which is comprised of solid element switches and cooling fins alternately stacked up to form a sandwich-shaped structure, and the electrode terminals stacked over the obverse and reverse surfaces of the solid element switches through the cooling fins and being connected with each other in series, a discharge block for generating a laser beam, which is formed into a structure integrated with the switch unit placed on an upper surface of the discharge block, and a strut wall provided with a plurality of conductors connecting the terminals of the discharge block and the output terminals of the switch unit. The switch reduces the inductance as the length of the conductor between the switch and the discharge block is shortened.

A discharge-excited laser apparatus according to a fifth aspect of the present invention is provided with a switch unit for releasing the energy accumulated in charging capacitors (pulse generating capacitor), which is comprised of solid element switches set upright on a switch barrel, with the electrode terminals on the obverse and reverse surfaces of the solid element switches being connected in series with each other via short-circuiting bars and with a plural number of rows of the solid element switches thus connected in series being further connected in parallel, a discharge block for generating a laser beam, which is formed into a structure integrated with the switch unit placed on an upper surface of the discharge block, and a plurality of conductors which are provided on the switch barrel and connect the terminals of the discharge block and the output terminals of the switch unit. The switch reduces the inductance since the length of the conductor between the switch and the discharge block is shortened.

A discharge-excited laser apparatus according to a sixth aspect of the present invention is provided with a power source/switch block comprised of a high-voltage power source which applies a high voltage necessary for the generation of pulses for laser output and a switch which, being connected in parallel to the high-voltage power source, promotes the discharge of the electric energy accumulated in a chargeing capacitor (pulse generating capacitor), a laser oscillating block having a discharge block which generates a laser beam by discharging the energy accumulated in a peaking capacitor charged with the energy shifted from the charging capacitor, and an energy transmitting means which forms connections between the high-voltage output terminals of the power source/switch block and the terminals of the charging capacitor in the laser oscillating block and between the ground terminal of the power source/switch block and the ground terminal of the laser oscillating block.

A discharge-excited laser apparatus according to a seventh aspect of the present invention is provided with a power source/switch block comprised of a high-voltage power source which applies a high voltage necessary for the generation of pulses for laser output and a switch which, being connected in parallel to the high-voltage power source, promotes the discharge of the electric energy accumulated in a charging capacitor (pulse oscillating capacitor), a laser oscillating block having a discharge block which generates a laser beam by discharging the energy accumulated in a peaking capacitor charged with the energy shifted from the charging capacitor and a coaxial energy transmitting means which concurrently serves as a charging capacitor and a connecting conductor between the power source/switch block and the laser oscillating block and is composed of a core wire, a dielectric covering the circumference of the core wire and an armoring metal covering the circumference of the dielectric.

A discharge-excited laser apparatus according to an eighth aspect of the present invention is provided with a power source/switch block comprised of a high-voltage power source which applies a high voltage necessary for the generation of pulses for laser output and a switch which, being connected in parallel to the high-voltage power source, promotes the discharge of the electric energy accumulated in a charging capacitor (pulse generating capacitor), a laser oscillating block having a discharge block which generates a laser beam by discharging the energy accumulated in a peaking capacitor charged with the energy shifted from the charging capacitor, and a plate-shaped capacity energy transmitting means which serves concurrently as a charging capacitor and a connecting conductor between the power source/switch block and the laser oscillating block and is composed of flat plates joined together under pressure with a dielectric set between them.

The energy transmitting means according to the sixth aspect of the present invention is formed by connecting the power source/switch block and the laser oscillating block, which are separate from each other, with conductors, and the coaxial energy transmitting means and the plate-shaped capacity/energy transmitting means according to the seventh and eighth aspect of the present invention respectively are constructed as component parts working concurrently as a charging capacitor and the connecting conductor and are so constructed that the means connects the power source/- switch block and the laser oscillating block, which are separate and treated as one circuit component part. Thus, these means have the effect of reducing the inductance, thereby increasing the rise-up velocity of the large current flowing into the switch.

A discharge-excited laser apparatus according to a ninth aspect Of the present invention is provided with a switch which promotes the discharge of the electric energy accumulated in a charging capacitor (pulse generating capacitor), a discharge block formed separately from the switch and starts the discharge to perform the generation of laser oscillation when the switch is turned on, an attaching/detaching part supporting base which connects two terminals of the switch and the discharge block in a manner permitting their free attachment and detachment, and a conductive piece which is held in contact under pressure with a contact spring provided in the attaching/detaching part supporting base. The attaching/detaching part supporting base and the conductive piece are constructed so as to be installed in pairs respectively on the switch and the discharge block separated from each other and to be inserted and extracted with ease and therefore simplify such jobs as the maintenance, inspection, and replacement of the switch.

BRIEF DESCRIPTION OF THE DRAWINGS

FIG. 3 through FIG. 5 show a first embodiment of the present invention in which FIG. 3 is a perspective view, FIG. 4 is a side view and FIG. 5 is a front view;

DETAILED DESCRIPTION OF THE PREFERRED EMBODIMENTS

Figure 1:
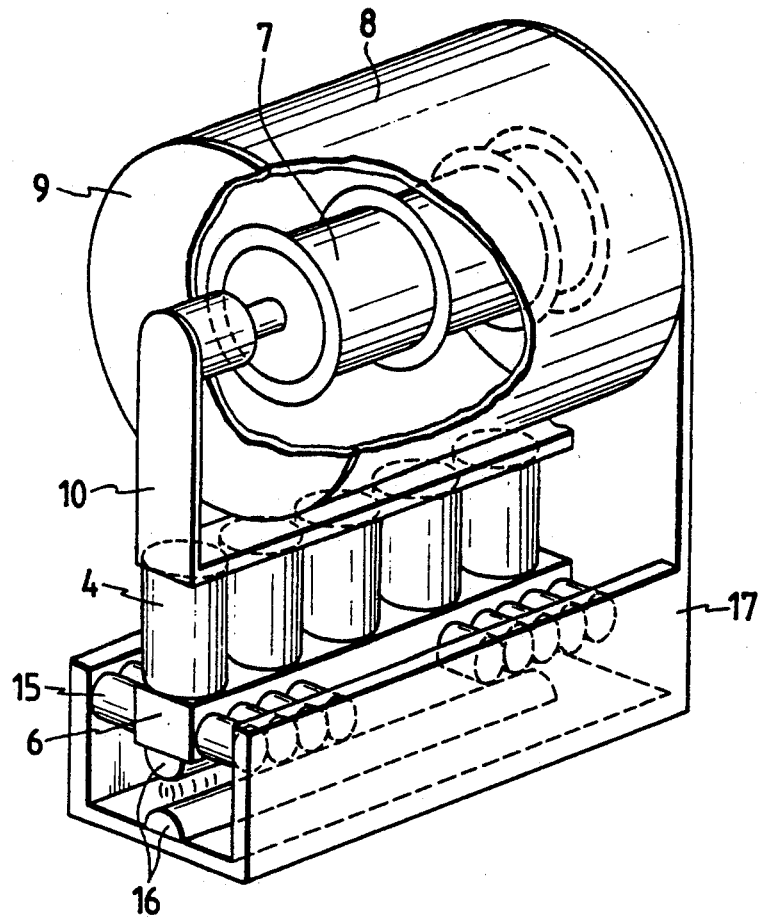
FIG. 1 is a perspective view showing a conventional high-voltage switch for a discharge-excited laser apparatus.
Figure 3:
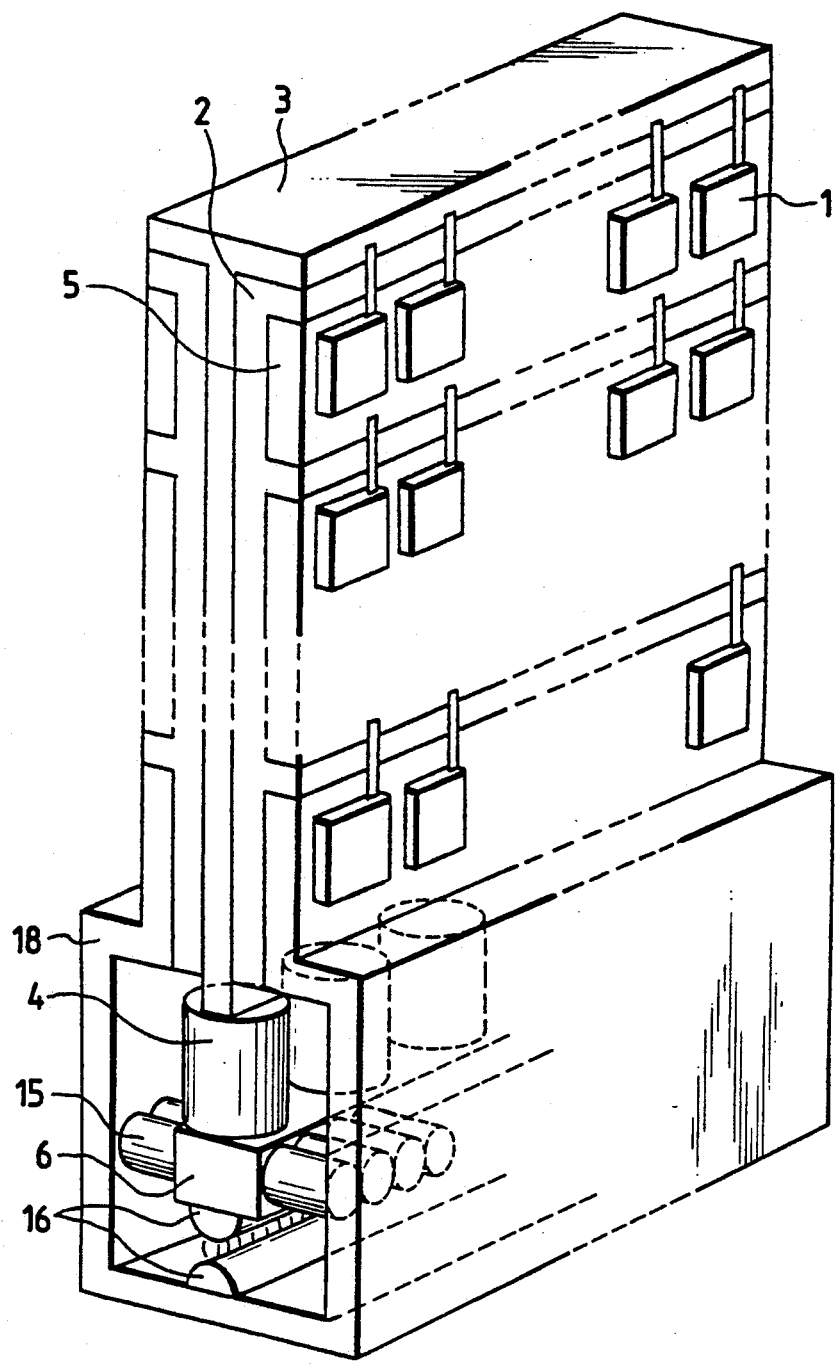
Figure 5:
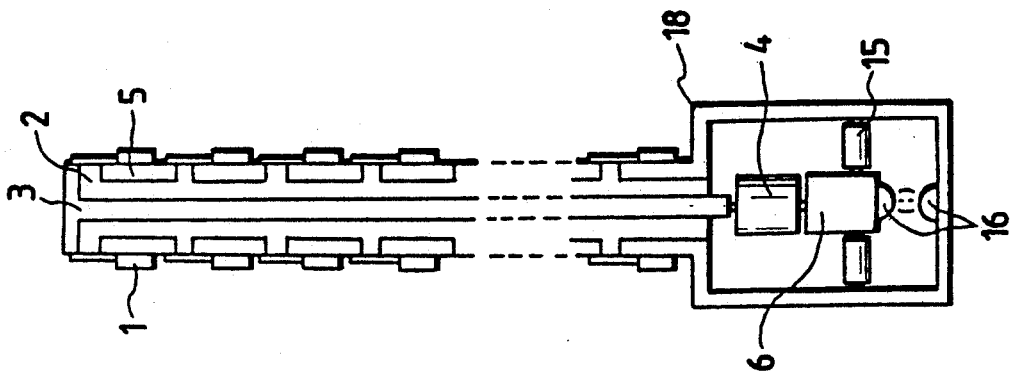
Figure 4:
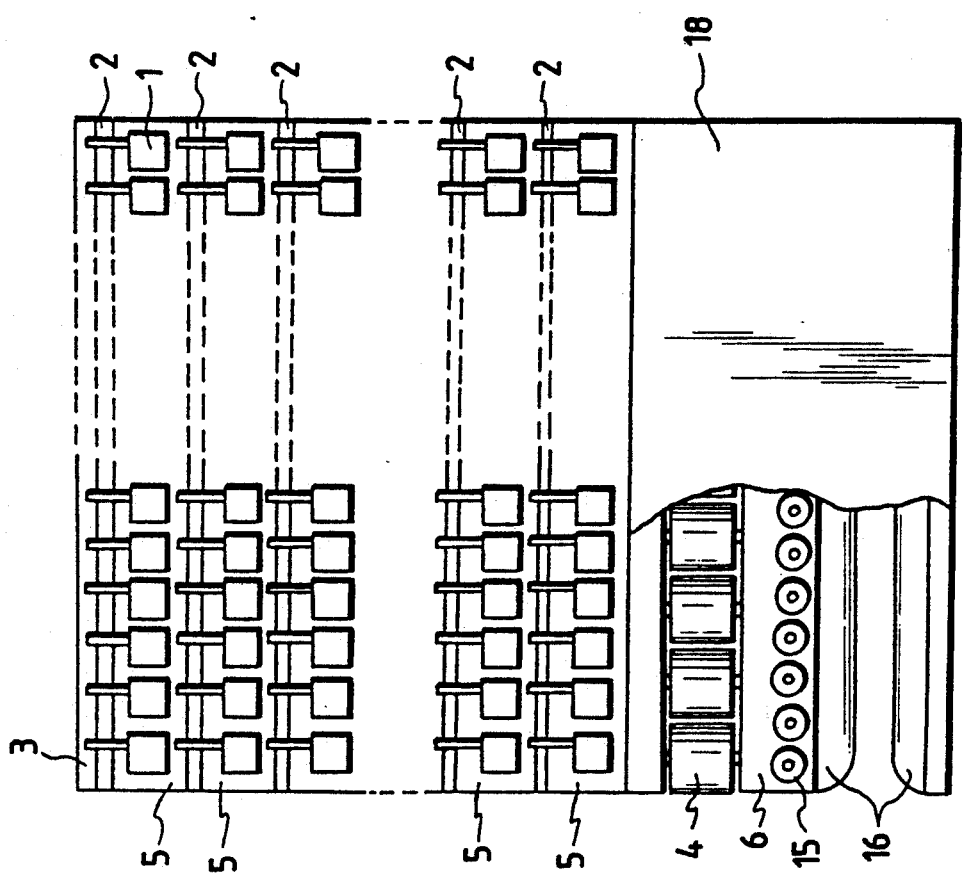

Now, a first embodiment of the present invention will be described with reference to FIG. 3 through FIG. 5. In these Figures, a plural number of FETs 1 are connected in parallel to a conductive plate 5, which works also as a heat radiating plate for the heat generated by the FETs 1. The respective conductive plates 5 on which the FETs 1 are thus mounted are connected in series. A plural number of charging capacitors 4 are connected in parallel with a feedback conductive plate 3. The feedback conductive plate 3 connects a switch comprised of a large number of FETs 1 to the charging capacitors 4. The feedback conductive plate 3 is disposed in parallel and in proximity with a multiple FET switch comprised of FETs 1 and the conductive plate 5, so that it is possible to reduce the inductance in this switch block to a low level. An insulating layer 2, which provides insulation between the feedback conductive plate 3 and the conductive plate 5, also plays a role in releasing heat from the conductive plate 5 by, for example, flowing a coolant medium through the layer. A conductive plate 18 forms a capacity shifting loop comprised of charging capacitor 4–feedback conductive plate 3–[FET 1–conductive plate 5 in multiple stages]–conductive plate 18–peaking capacitor 15–lower conductive plate 6–charging capacitor 4. Those parts indicated by the same reference numbers as in FIG. 1 represent the same parts.

Figure 2:
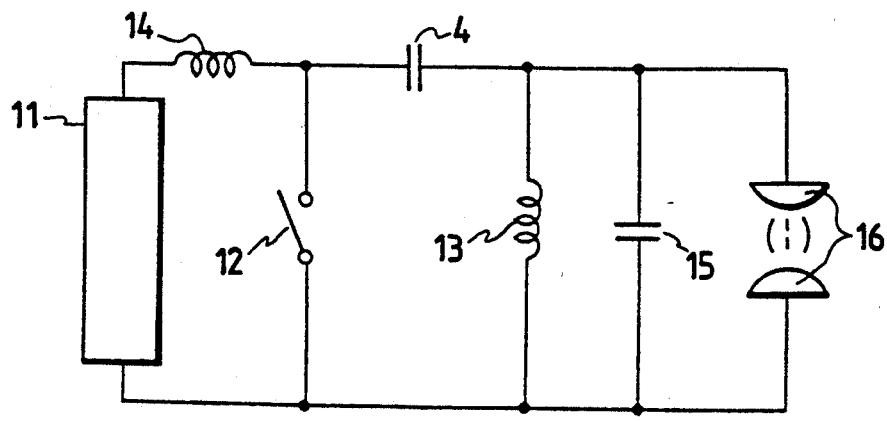
FIG. 2 is a wire connection diagram for illustration of a description of the operations of a high-voltage switch.

The construction described above is expressed in terms of electrical circuitry as shown in FIG. 2. However, the high-voltage power source 11 and the reactors 13 and 14 are not illustrated in FIG. 3 through FIG. 5. Also, the high-voltage switch 12 in FIG. 2 corresponds to the FET switch block comprised of the FETs 1, the conductive plates 3 and 5, and the insulating layer 2.

Next, the operations of the switch will be described. First, electric charge is accumulated in the charging capacitor 4 from the high-voltage power source 11 through the reactors 13 and 14. Thereafter, the closure of the switch 12 shifts the electric charge in the charging capacitors 4 to the peaking capacitors 15. When electric charge is thus accumulated in the peaking capacitors 15, the electric charge is then put promptly to the laser discharge electrodes 16.

In this embodiment, if the charging capacitors 4 and the peaking capacitors 15 are arranged in parallel on a plane in the longitudinal direction of the electrodes, the high-voltage switch 12 can be formed of the FETs 1 in the plane in the longitudinal direction of the electrodes. Therefore, the high-voltage switch can transmit the electric charge accumulated in the charging capacitors 4 to the peaking capacitors 15 uniformly in the longitudinal direction of the electrodes through the multiple connection of the feedback conductive plate 3, the FETs 1 and the conductive plates 5 by turning on the many FETs 1 all at the same time. Thus, the switch can charge all the peaking capacitors 15 uniformly in the longitudinal direction of the electrodes and can eventually feed uniform electric charge in the longitudinal direction of the discharge electrodes 16.

In the embodiment given above, multiple stage FET switches each comprised of the FETs 1 and the conductive plate 5 are provided on both sides of the feedback conductive plate 3, but the multiple stage FET switches may be installed on the inner side, with the feedback conductive plate provided on both sides thereof.

Also, the description in the embodiment given above has been made with respect to a laser generating circuit of the capacity shifting type, but the same effect can also be obtained for a non-capacity-shifting type circuit which puts the electric charge of the charging capacitor 4 as it is into the discharge field.

Furthermore, FETs are used in the embodiment given above, but it is also possible to build the high-voltage switch with an IGBT or a thyristor through which a larger current can be conducted. Moreover, a large number of thyratrons arranged in parallel will produce the same effect.

As described above, according to the first embodiment, a large number of semiconductor switches are arranged in series and in parallel in the longitudinal direction of the electrodes, so that the switch can be constructed in a shape matched with the shape of the capacitor and the discharge field. Therefore, the switch can transmit the accumulated electric charge uniformly in the longitudinal direction of the discharge electrodes, thereby realizing a uniform distribution of electric charge in the discharge field. In addition, the construction of the switch can reduce the inductance in the capacity shifting circuit, so that it is possible for the switch to apply pulses with a quick rise between the electrodes. Thus, by both of the effects just mentioned, the switch attains uniformity in the discharge in the longitudinal direction, and achieves an increase in the laser oscillating efficiency.

Figure 6:
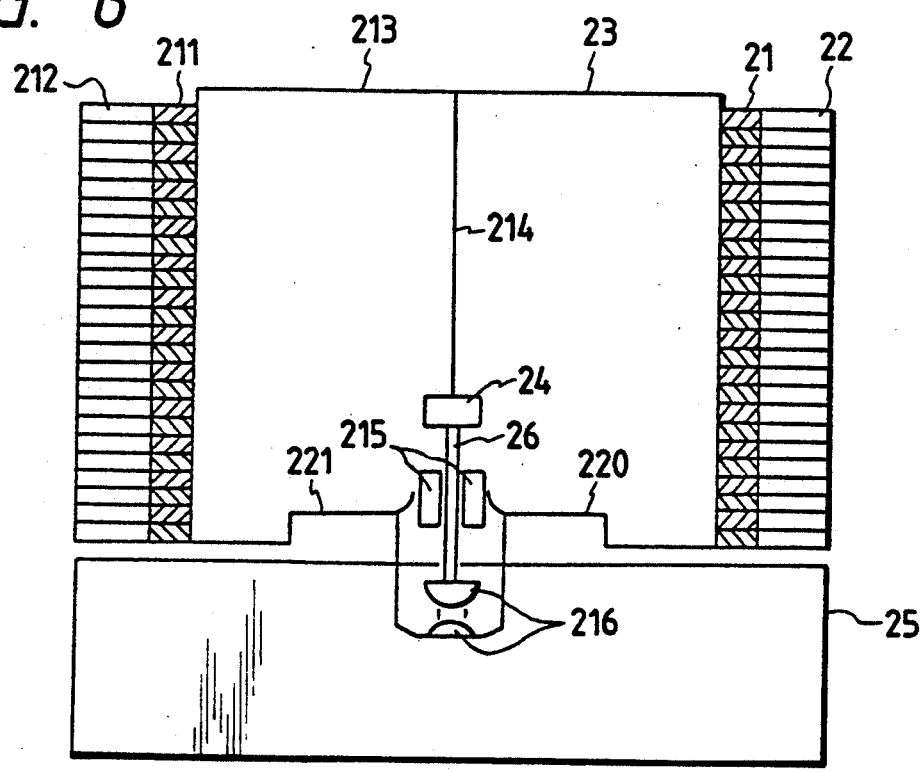
FIG. 6 is a construction view illustrating a discharge-excited laser apparatus according to a second embodiment of the present invention.
Figure 7:
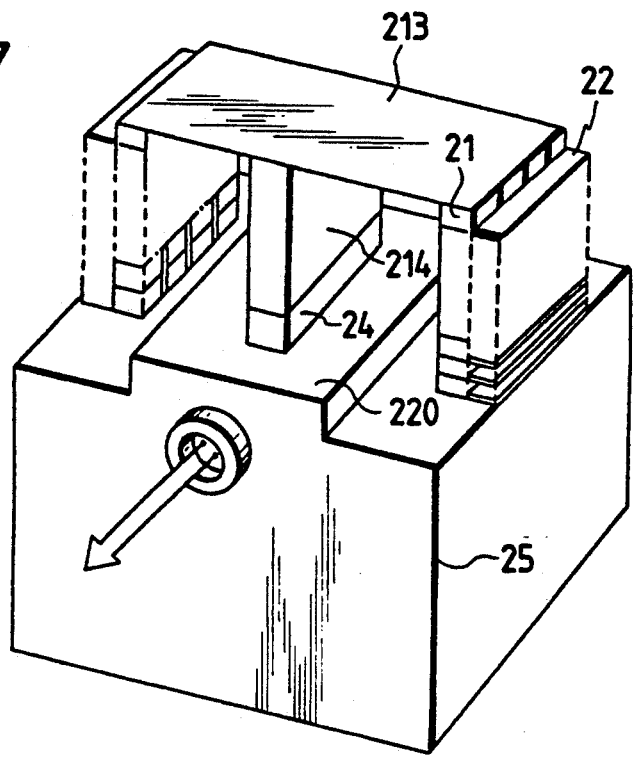
FIG. 7 is a perspective view illustrating the discharge-excited laser apparatus of the second embodiment of the present invention.

A second embodiment of the present invention will be described with reference to FIGS. 6 and 7. FIG. 6 is a construction view illustrating a discharge-excited laser apparatus according to the second embodiment of the present invention, and FIG. 7 is a perspective view illustrating the discharge-excited laser apparatus. In these drawings, reference numbers 21 and 211 respectively indicate solid switching elements operating at a switching time of 500 nanoseconds or less. Reference numbers 22 and 212 respectively indicate heat radiating plates. Reference number 23, 213, 214, 220, and 221 respectively indicate a conductive plate. Reference number 25 indicates a laser housing body.

Next, the operations of the laser apparatus will be described. The solid switching elements are set in multiple stages in order to increase their withstand voltage and also arranged in parallel along the direction of an optical axis in order to increase their current capacity. The essential operation of the laser apparatus is the same as the conventional laser apparatus as shown in FIG. 1 except that the switching elements have replaced the thyratron of the conventional apparatus. Here, the solid switching elements are installed, when viewed on a sectional plane perpendicular to the optical axis, on both sides of a virtual line drawn in such a manner that the line passes through the discharge electrodes. Here, the shifting loops formed with this arrangement are a counter-clockwise loop leading from the charging capacitor 24 to the conductive plate 26, then to the conductive plate 220, then to the solid switching elements 21, then to the conductive plate 23, then to the conductive plate 214, and then to the charging capacitor 24 and a clockwise loop leading from charging capacitor 24 to the conductive plate 26, then to the conductive plate 221, then to the solid switching elements 211, then to the conductive plate 213, then to the conductive plate 214, and then to the charging capacitor 24. These two loops, which are reverse in the direction of the current flow, work respectively so as to cancel off the inductance in them. Also, the solid switching elements are installed dispersively in the direction of the optical axis, so that the current will not converge as in the case of the thyratron mentioned above. As the result, the laser apparatus can keep the inductance extremely low in the shifting loops and can thereby achieve a high dv/dt and attain high stability and uniformity in the discharge. For example, when solid switching elements operating with the switching time of 40 nanoseconds are used, the overall inductance in the loops will be 100 nH or less.

In the embodiment given above, the description has been made with respect to a circuit of the capacity shifting type. Yet, the present invention is not limited to this form of embodiment, but can be applied also to a circuit in which the electric charge of the capacitor 24 is put directly into a discharge field.

As described above, according to the second embodiment of the present invention, a plural number of solid switching elements are used as the high-voltage switch, which are arranged on both sides of a virtual line drawn in such a manner as to pass through the discharge electrodes as viewed in a section crossing the optical axis at a right angle, and the laser apparatus is therefore capable of reducing the inductance of the shifting loops and thereby obtaining a high dv/dt ratio by which the apparatus can attain high stability and uniformity in its discharge. In addition, the laser apparatus does not require any strict temperature control and therefore achieves the effect that the reliability of the apparatus is thereby enhanced.

Figure 8:
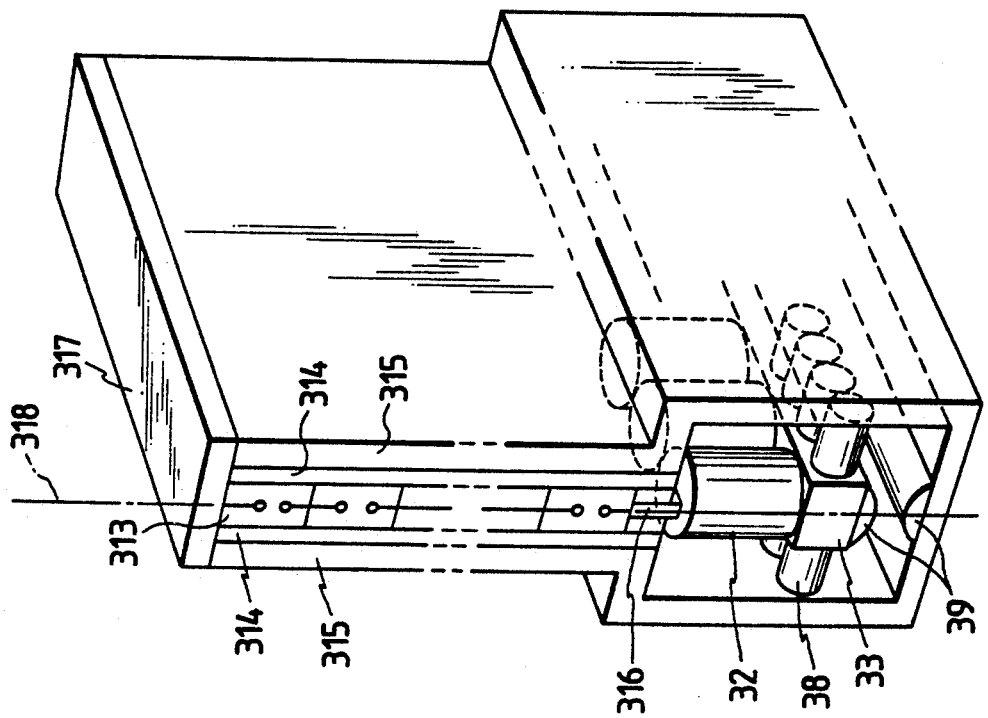
FIG. 8 is a perspective view of a third embodiment of the present invention.

A third embodiment of the present invention will be described with reference to FIG. 8 and FIG. 9. In FIG. 8, reference number 313 indicates a plural number of switches. Reference number 314 indicates an insulator arranged in contact with the switches 313. Reference number 315 indicates a conductive plate. Reference number 316 indicates a conductive plate connecting the switches 313 and charging capacitors 32. Reference number 317 indicates a conductive plate connecting the conductive plate 315 and the switches 313. Reference number 318 indicates a virtual line passing through electrodes 39 as viewed in a section crossing the optical axis of the laser at a right angle. The switches 313 are positioned on the virtual line 318, and the current flowing through the switches 313 will flow along the virtual line 318. A switch block including the switches 313 is arranged in parallel with the longitudinal direction of the discharge electrodes 39.

The high-voltage side of a power source is connected to the upper part of the switches 313 and the ground side of the power source is connected to the upper part of the conductive plate 315. When the switches 313 are turned on, a shifting loop is formed to connect the switches 313 to the conductive plate 316, the charging capacitors 32, the conductive plate 33, the peaking capacitors 38, the conductive plate 315, and the conductive plate 317.

Next, the operations of the laser apparatus will be described. The closed loop in the discharge-exciting circuit contains inductance L, which is determined by the structure of the loop, and, if the value of this L is high, the rise-up velocity dv/dt of voltage between the discharge electrodes (main electrodes) 39 declines, and such a decline leads to a decline in the output from the laser apparatus and a reduction of its operating efficiency. In this embodiment, the structural inductance L in the closed loop including the switch block can be decreased by arranging a switch block comprised of a plural number of switches 313, which transmit the discharged energy to the space between the discharge electrodes, on a virtual line 318 drawn in such a manner as to pass through the discharge electrodes 39 as viewed in a section crossing the optical axis of the laser at a right angle.

With the high-voltage side of the power source connected to the upper part of the switches 313 and with the ground side of the power source connected to the lower part of the conductive plate 315, the charging capacitors 32 are charged through a closed loop (11-1-4-4-13-11 as shown in FIG. 2), and thereafter the switches 313 are turned on. Then, the electric charge accumulated in the charging capacitors 32 begins to shift to the peaking capacitors 38, and the return current returns to the switches 313 from the ground potential side terminal of the peaking capacitors 38 via the conductive plate 315 and the conductive plate 317. Along with this, the voltage between the discharge electrodes 39 rises sharply, and the discharge space breaks down soon, so that the energy built up in the peaking capacitors 38 is put into the discharge field. As a result, the gas in the discharge space is excited, and a laser beam is produced by stimulated emission.

Figure 12:
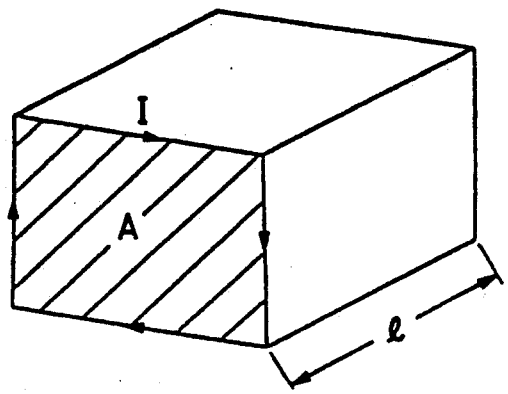
FIG. 12 is a perspective view for illustration of description of the structural inductance.

Here, when the closed loop in the discharge exciting circuit is in a construction with a sectional area A and a depth l as illustrated in FIG. 12, this closed loop contains the structural inductance component L, which is determined by the following relational equation:

$$L = \mu_0 \frac{A}{l}$$

(where, $\mu_0$ is permeability of vacuum)

Figure 13:
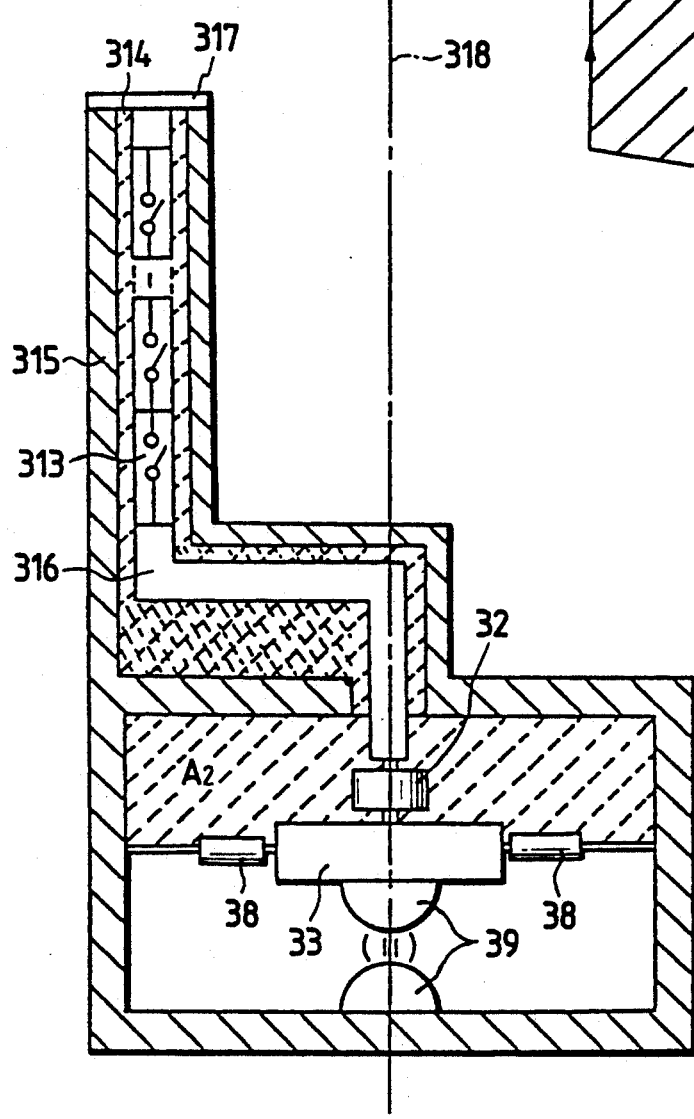
FIG. 13 is a perspective view for describing the structural inductance of a laser apparatus.

FIG. 13 shows a discharge-excited laser apparatus which is not included in the third embodiment in which a switch block is arranged on a virtual line 318 passing through the discharge electrodes. In FIG. 13, the shifting loop formed of 317-313-316-32-33-38-315-317 contains the structural inductance component which is determined by the area $A_2$ of the part shown by the dotted diagonal lines. On the other hand, FIG. 9 shows a switch block arranged on a virtual line 318 passing through the discharge electrodes 39, and the area $A_1$ which determines the structural inductance contained in the shifting loop is the area shown by the dotted diagonal lines in FIG. 9. Thus, the area $A_1$ is smaller than the area $A_2$ by the area shown by the bi-directional diagonal lines in FIG. 13. Accordingly, in this embodiment, the structural inductance L contained in the shifting loop can be reduced by $$\Delta L = \mu_0 \frac{A_2 - A_1}{l}$$

By this, a rise-up speed of voltage on both terminals of the peaking capacitors 34 and voltage between the discharge electrodes 39 can be increased, and an increase in the output from the laser apparatus and an increase of its operating efficiency can be attained thereby.

If the switches 313 in FIG. 8 are made in a construction longer in the longitudinal direction of the discharge electrodes 39, the value l in FIG. 12 will eventually be made larger, and the value of $$L = \mu_0 \frac{A}{l}$$

can be reduced further.

Figure 10:
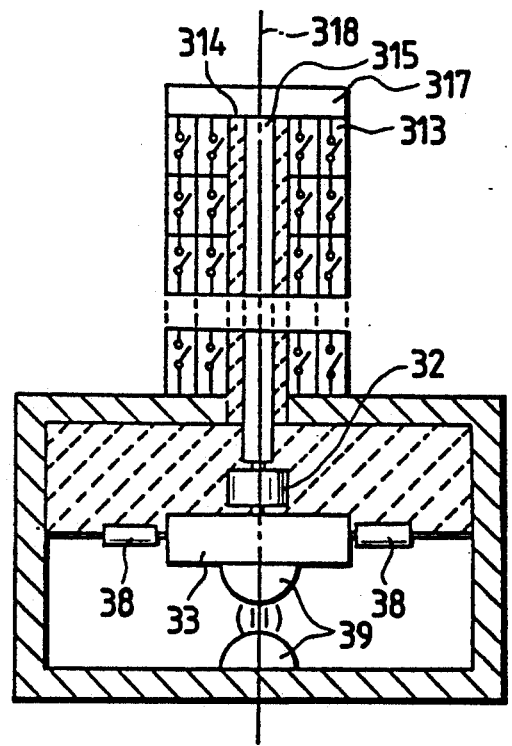
FIG. 10 and FIG. 11 are respectively vertical sectional views of modified example of the third embodiment.

Also, in the third embodiment, the switches 313 are arranged on the virtual line 318 passing through the electrodes 39, and the conductive plate 315 is arranged on both sides of the switches 313 through the insulator 314. However, as shown in FIG. 10, it will be feasible to arrange the conductive plate 315 on the virtual line 318 and to arrange the switches 313 on both sides of the conductive plate 315 via the insulator 314.

Figure 9:
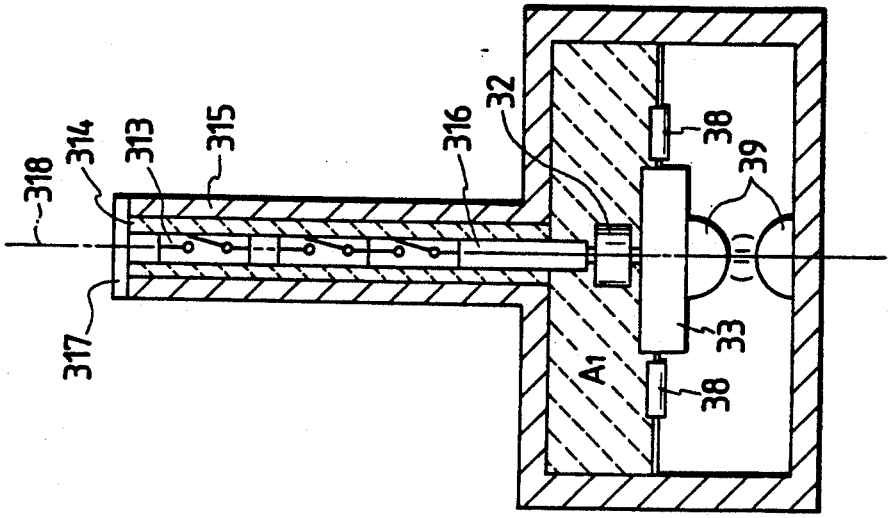
FIG. 9 is a vertical sectional view of the third embodiment of the present invention.

Furthermore, the embodiment shown in FIG. 9 has the insulator 314 and the conductive plate 315 arranged on both sides of switches 313, but the insulator 314 and the conductive plate 315 may be arranged only on one side of the switches 313. However, the number of the parallel lines in the shifting loop in this case will be one half of the number thereof in a case in which the insulator 314 and the conductive plate 315 are arranged on both sides of the switches 313, and the inductance in the shifting loop will therefore be two times as much as in the case in which the insulator 314 and the conductive plate 315 are arranged on both sides of the switches 313.

Furthermore, by using the solid switching elements operating in the switching time of 500 nanoseconds or less as the switches 313, the temperature control and the preheating time before the start of the operation, which are necessary for an apparatus in which a thyratron is used, will be rendered unnecessary, and the operation of the laser apparatus will be made easier.

Figure 11:
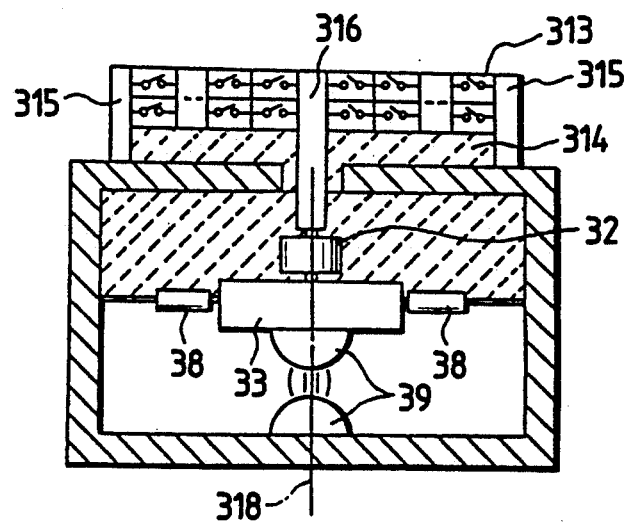

Also, although a plural number of the switches 313 are arranged in a straight line in the vertical direction in the embodiment, the switches 313 may be arranged in such a manner that they form a straight line in the horizontal direction as shown in FIG. 11, and the same effect can be achieved.

As described above, according to the third embodiment of the present invention, a switch block comprised of a plural number of switches and conductive plates is arranged on a virtual line drawn in such a manner as to pass through a pair of discharge electrodes in a section crossing the optical axis of the laser at a right angle, so that the laser apparatus is capable of attaining high stability and uniformity in its discharge. Also, when solid switching elements are used as the switches, a reliable apparatus, which does not require strict temperature control, can be obtained.

Figure 14:
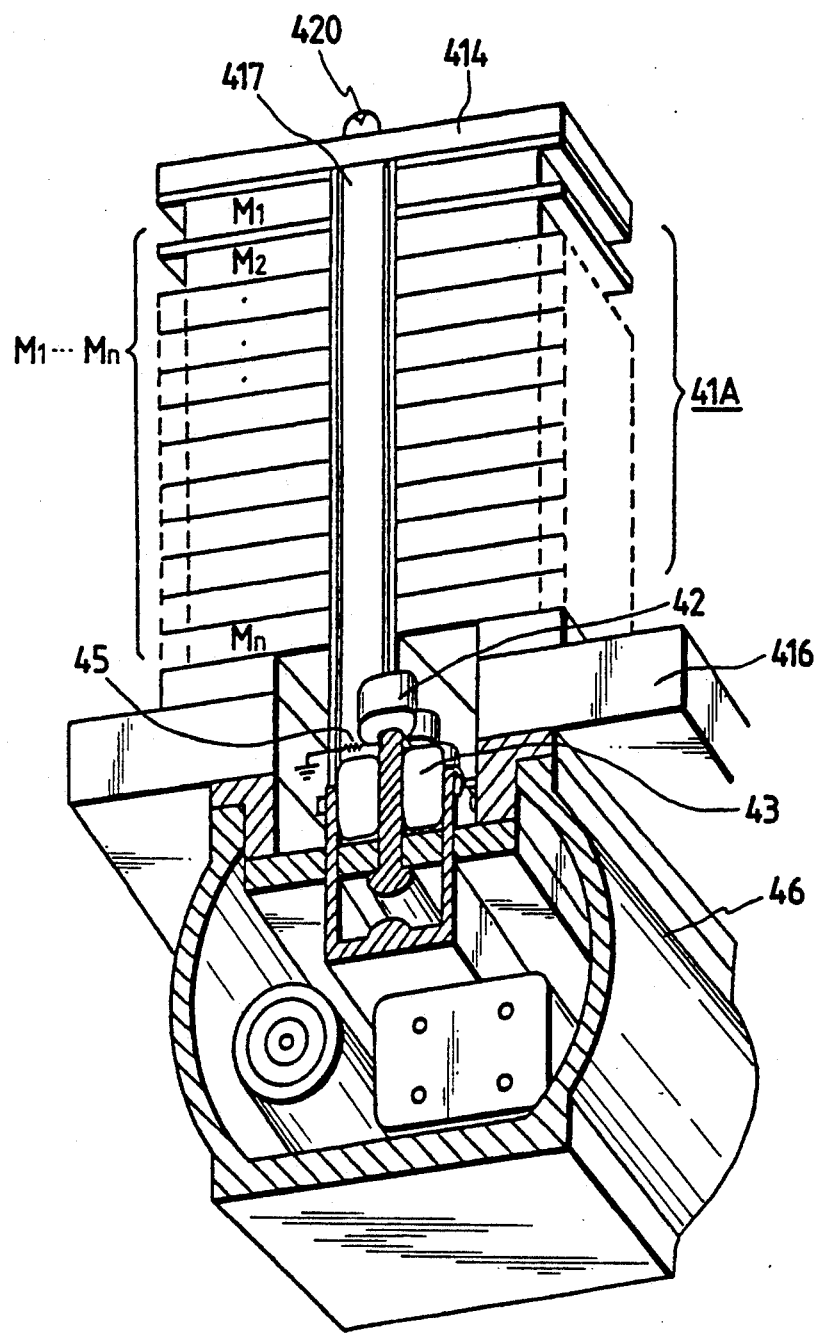
FIG. 14 is a partial sectional view of a fourth embodiment of the present invention.
Figure 15:
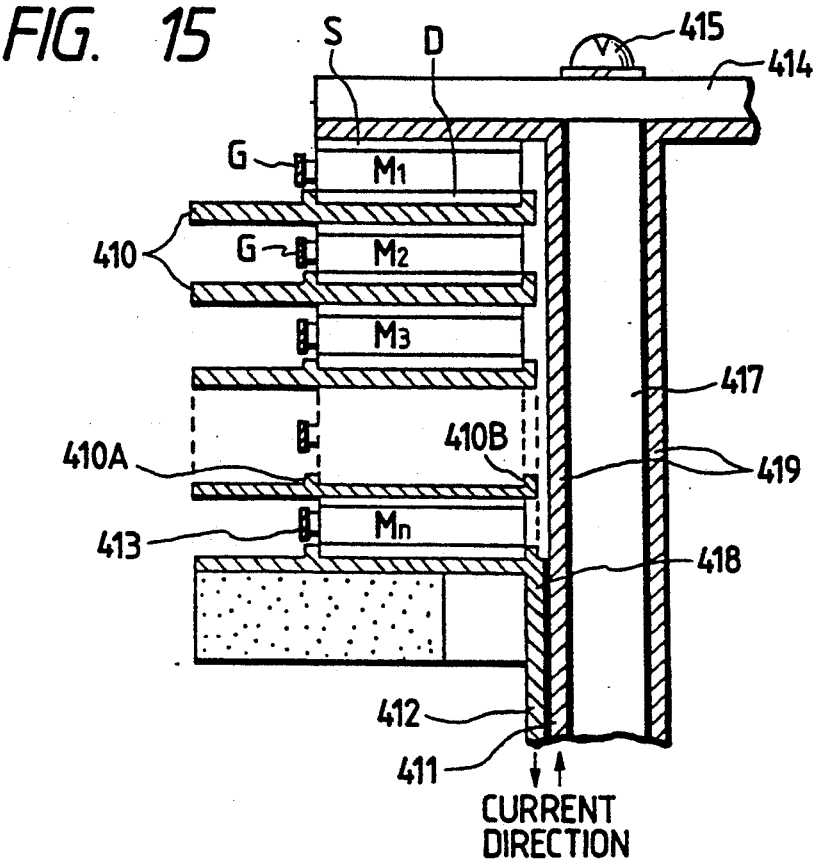
FIG. 15 is a partial sectional view illustrating the switch shown in FIG. 14.

A fourth embodiment of the present invention will be described with reference to FIGS. 14 through 17. In FIG. 14, reference number 41A indicates a switch formed in blocks with solid element switches $M_1$ through $M_n$ stack in series in multiple stages. FIG. 15 is a partial sectional view illustrating the details of the construction of the switch, and reference number 410 indicates cooling fins held between the solid element switches $M_1$ through $M_n$, and the solid element switches $M_1$ through $M_n$ are formed, for example, into a structure in the shape of a rectangular parallelopipedon and are provided with a source terminal 411 and a drain terminal 412 on the obverse and reverse surfaces and a gate terminal 413 on the side surface. Reference number 414 indicates a plate which fixes the entire structure of the switch 41A with a mounting screw 415. Reference number 416 indicates a base, reference number 417 indicates a strut wall provided with conductors 418 and 419, and reference number 420 indicates a fixing screw.

Next, the operations of the apparatus will be described. A description of the operations on a circuit will be omitted here as such operations are the same as the particulars mentioned in respect of the prior art, and the structure by which the switch 41A is actually installed on the discharge block 46 will be described below. First, the laser apparatus is roughly divided into two parts, that is, the switch 41A and the discharge block 46 are thus separated. For the assemblage, the base 416 is placed on the discharge block 46, and the strut wall 417 is then installed upright. The strut wall 417 is provided on its side with a conductor 418, which is available for its exclusive use with the drain terminal 412, and a conductor 419, which is available for its exclusive use with the source terminal 411, for example. On the base 416, the switch 41A, which is formed of the cooling fins 410 and the solid element switches $M_1$ through $M_n$ stacked alternately in a sandwich-shaped construction, is joined for stable seizure of its side with the protruding parts 410A and 410B of the cooling fins 410, and the whole switch is tightened to the strut wall 417 with the fixing screw 420 via the plate 414. The switch 41A in a block form installed on the discharge block 46 will have wireless connections and will be fixed rigidly if the switch is constructed in this manner, and the length of the conductor which connects these two will therefore be in the shortest distance.

Figure 16:
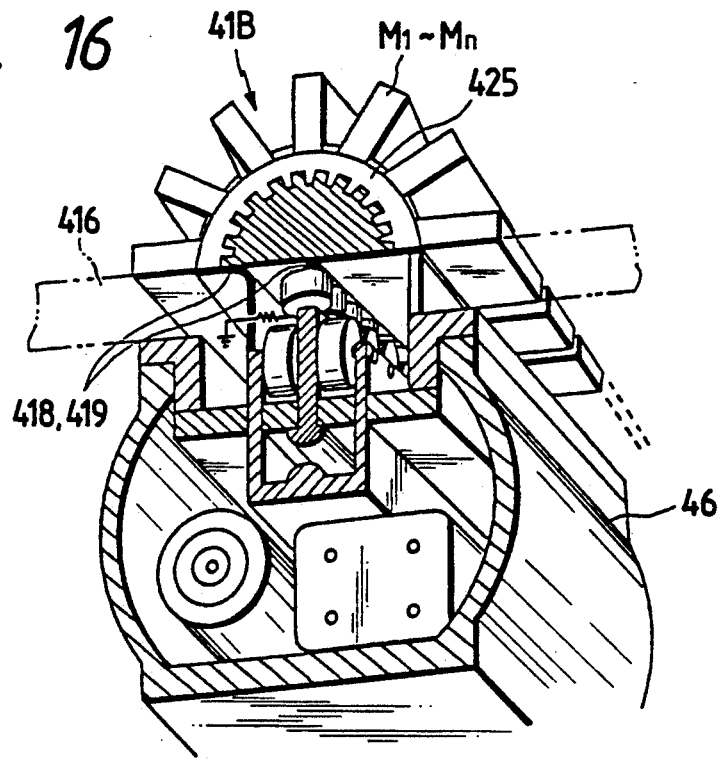
FIG. 16 is a partial sectional view of a modified example of the fourth embodiment of the present invention.

FIG. 16 illustrates a modified embodiment of the fourth embodiment of the present invention. In this Figure, reference number 425 indicates a semi-cylindrical switch barrel made of cast Al (aluminum) which has the solid element switches $M_1$ through $M_n$ installed thereon in the shape of a fan, for example, and works also as a cooling device. The surface of the switch barrel is processed for insulation.

Figure 17:
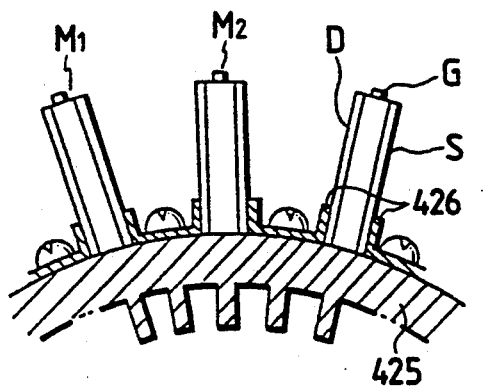
FIG. 17 is a partial sectional view illustrating the switch shown in FIG. 16.

Next, the actual installation of the switch 41B will be described with reference to FIG. 17. The solid element switches $M_1$ through $M_N$ which are applied in this case are in the shape of a rectangular parallelopipedon, and these are arranged in a radial form as illustrated in FIG. 17 on the switch barrel 425. Then, the source S and the drain D on the adjacent solid element switches $M_1$ through $M_n$ are fastened to the switch barrel 425 with screws via the short-circuiting bars 426 in order to form their electrical connections in series with each other. These rows of switches thus connected in series on the circumference of this switch barrel are then connected in parallel with other rows of switches formed in the longitudinal direction, and the large current and high voltage switch 41B formed with connections in series and in parallel is thus constructed. The source and drain terminals on both sides as led out of the switch 41B are connected to the conductors 418 and 419 and connected ultimately with the mounting terminals of the charging capacitors (pulse generating capacitor) 42 and the peaking capacitors 43 in the discharge block 46.

In the embodiment shown in FIG. 16, the installation of the solid element switches has been described on the semi-cylindrical switch barrel 425 which performs concurrent functions of cooling and ventilation. However, the switch barrel is not limited to a semi-cylindrical form, but may be a trapezoid or other shape, and need not have any void space in it, and will still produce the same effect as in the embodiment given above.

As described above, according to the fourth embodiment, the solid element switches and the cooling fins are put together in a sandwich-shaped structure integrated into a single unit, the switch thus formed is placed on the discharge block, and the electrodes of the switch are fixed in contact with the conductors set on the strut wall provided on the discharge block. Therefore, the apparatus can be made compact, and the length of the conductors between the switch and the discharge block can be reduced considerably. The construction according to the present invention therefore produces the effect of a reduction of inductance and an increase of the laser efficiency through curtailment of the rise-up time of the pulse current.

Moreover, according to the modified embodiment of the fourth embodiment, solid element switches are arranged upright on a switch barrel, and the solid element switches are connected in series with short-circuiting bars. The solid element switches thus connected in series are further connected in a plural number of rows in parallel connection, and the switch barrel is placed on the discharge block and is connected to the discharge block through conductors. The construction will therefore attain the same effect as that obtained by the construction of the fourth embodiment.

Figure 18:
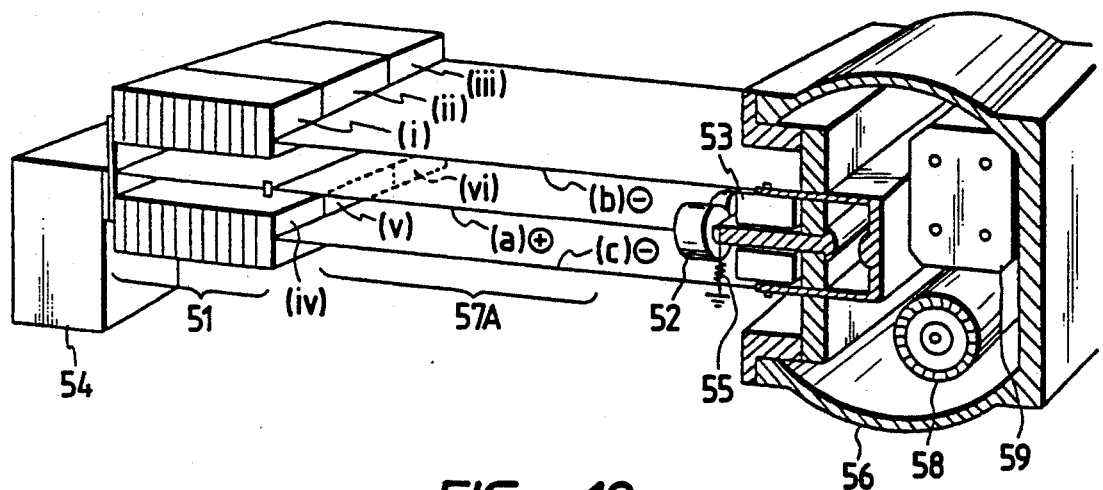
FIG. 18 is a perspective view showing a discharge-excited laser apparatus using a plate-form energy transmitting means according to a fifth embodiment of the present invention.

A fifth embodiment of the present invention will be described with reference to FIG. 18. In FIG. 18, reference number 57A indicates an energy transmitting means, namely, flat plates as conductors.

Figure 19:
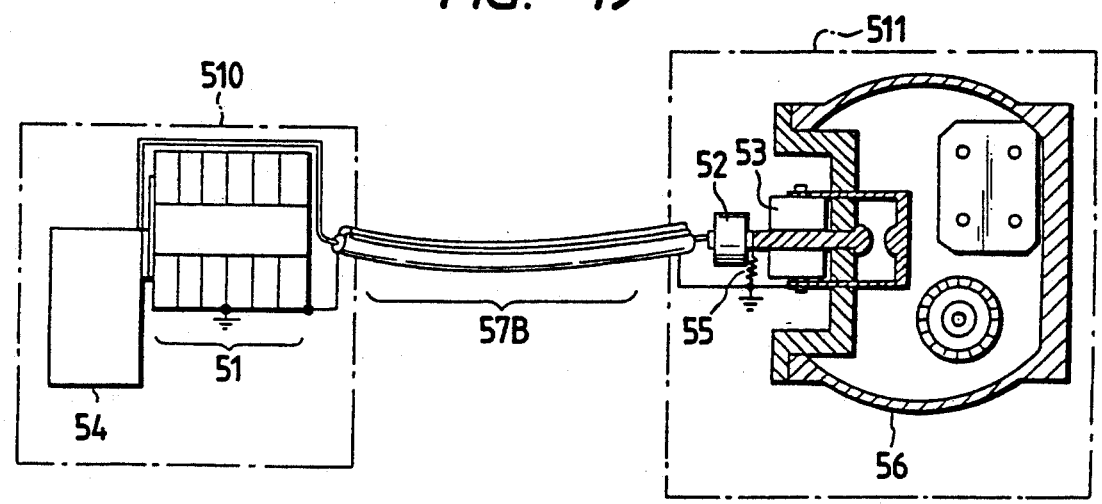
FIG. 19 is a view showing a discharge-excited laser apparatus using a coaxial cable of the present invention.

Next, the operations of the apparatus will be described. A description of the overall operations on a circuit is omitted here as such operations are the same as the particulars mentioned in respect of the prior art, and the structural differences will be described below. As illustrated in FIG. 18, the construction of the laser apparatus is divided into a discharge block 56, a high-voltage power source 54, and a switch 51. The switch 51 is made, for example, of solid element switches constructed in blocks with a plural number of FET (Field Effect Transistor) modules stacked in series and in parallel, and the switch is arranged at the side of the high-voltage power source 54. In the case of the circuit illustrated in FIG. 18, the group of switches (i), (ii), and (iii) and the groups of switches (iv), (v), and (vi) are both formed into one switch 51 by the parallel arrangement of the blocks in which the switches are stacked in series in multiple stages. This switch 51 is fixed in the proximity of the high-voltage power source 54, and the space (a) between the switch 51 and the charging capacitors (pulse generating capacitor) 52 and the spaces (b) and (c) between the peaking capacitors 53 and the other terminal of the switch 51 and the high-voltage power source 54 are connected with the flat plates 57A as an energy transmitting means (for reference, (a), (b), and (c) are illustrated in FIG. 18). With the switch 51 constructed in this manner, the inductance is reduced considerably. Also, the inductance in the circuit is reduced to one half by the connection of switch 51 and the discharge block 56 with the three flat plates 57A as illustrated in FIG. 18. It is to be noted that the flat plates 57A is not necessarily to be limited to three pieces, but may be two pieces or another number of pieces within the scope of the object of reducing the inductance. Moreover, as shown in FIG. 19, a plural number of coaxial cables 57B may be used in parallel in place of the flat plates 57A. The use of the coaxial cables 57B in this manner brings about a considerable improvement on the degree of freedom in the arrangement of the switch block 510 and the laser oscillating block 511.

Figure 20A:
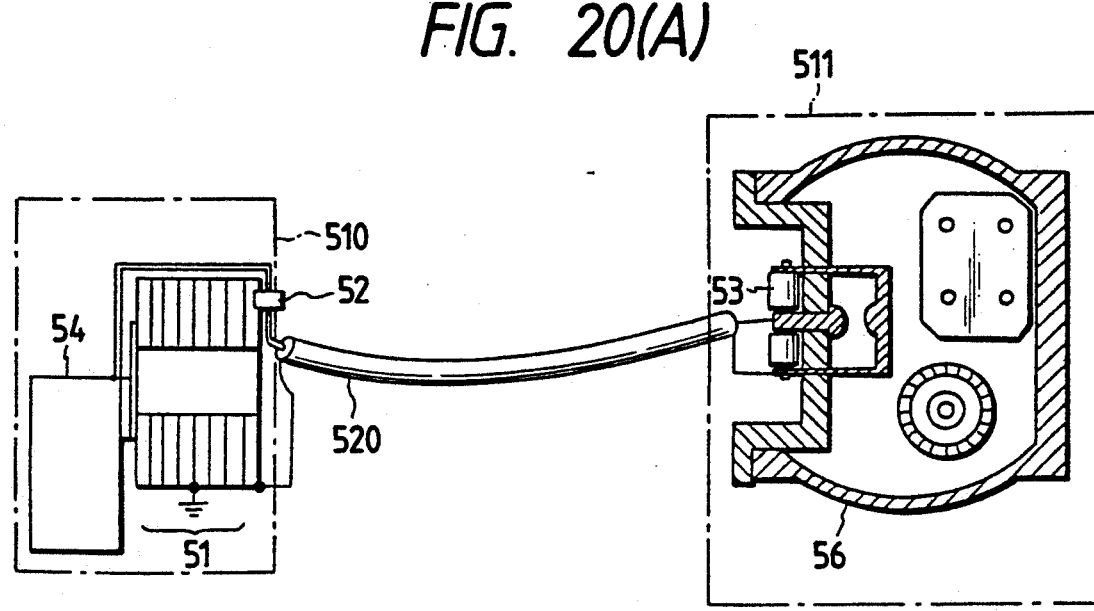
FIGS. 20(A) to 20(C) are views showing a discharge-excited laser apparatus using a coaxial energy transmitting means of the present invention.
Figure 20B:
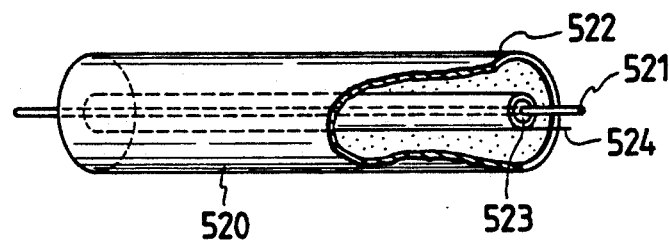
Figure 20C:
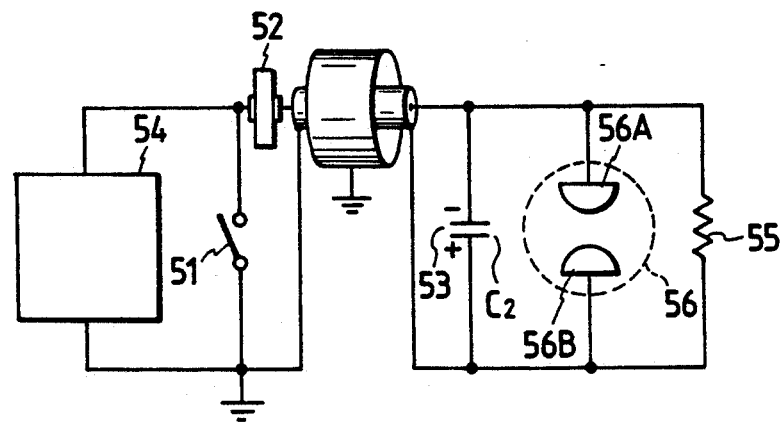

FIG. 20 illustrates a modified embodiment of the fifth embodiment, in which FIG. 20(A) is a schematic drawing of the overall construction, FIG. 20(B) shows the construction of the coaxial energy transmitting means 520, and FIG. 20(C) shows an equivalent circuit. The coaxial energy transmitting means 520 is made by covering the circumference of a coaxial cable formed of a core wire 521 and an armoring metal 524 with shield wire 522, and this means forms a connection between the capacitor 52 positioned at the power source side and the capacitor 53 positioned at the discharge electrode (main electrode) side. In this case, the energy transmitting means 520 also performs the function of shaping the high-voltage pulses, increasing the efficiency of the laser. The armoring metal 524 is provided in order to reduce the noises generated in the course of transmission. The usual capacity of the charging capacitor (pulse generating capacitor) 52 which is used in the excimer laser is approximately in the range from 30 to 60 nanofarads, and it is therefore possible to obtain a sufficient capacity even with a construction like this.

Figure 21A:
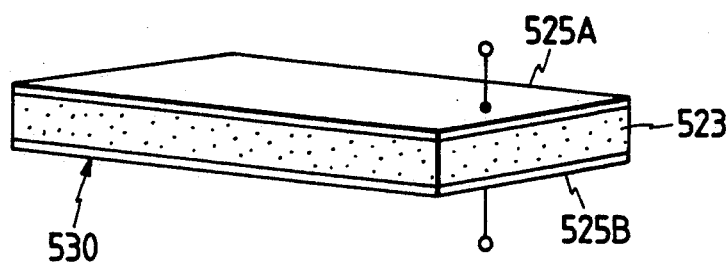
FIGS. 21(A) and 21(B) are views showing an apparatus using a plate-shaped capacity/energy transmitting means of the present invention.
Figure 21B:
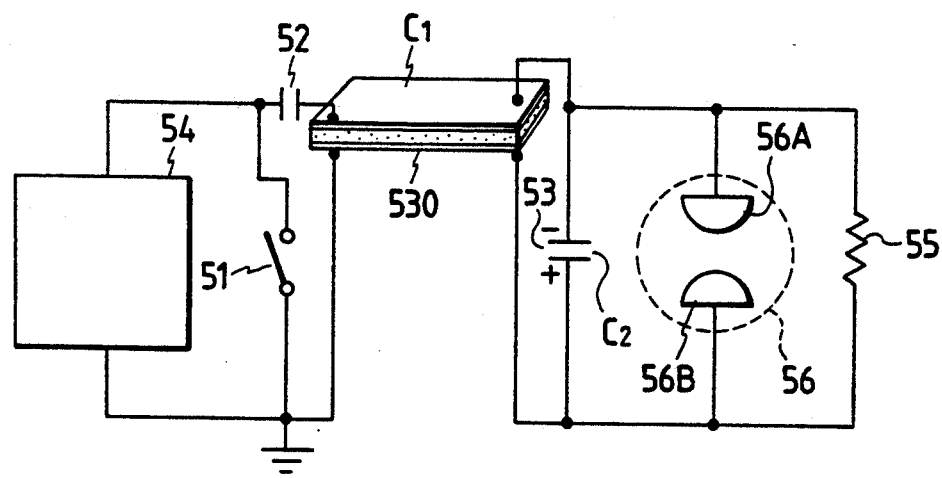

FIG. 21(A) illustrates another modified embodiment of the fifth embodiment of the present invention in which a plate-shaped capacity/energy transmitting means 530 is employed. In this case, the capacity/energy transmitting means 530 is in a sandwich structure formed by holding a dielectric 523 in plane-form contact under pressure with flat plates 525A and 525B, which are conductors. In other words, the dielectric 523 is set between the flat plates 525A and 525B in the closest proximity to form an electric field, and thus these together form a structure which performs the combined functions of a connecting conductor and the charging capacitor (pulse generating capacitor) 52. FIG. 21(B) illustrates an example of actual installation when the structure of the means just mentioned is applied to a circuit. The adjustment of the electrostatic capacity is made by selecting the vertical and horizontal sizes.

In the above embodiment, the coaxial energy transmitting means 520 and the plate-shaped capacity/energy transmitting means 530, which respectively combines the functions of the charging capacitor (pulse generating capacitor) and the conductor are described, but the structure may be applied in the same way to the peaking capacitor 53 and will produce the same effect as that described in the above embodiment.

Also, in the embodiment shown in FIG. 19, a generally used coaxial cable with shield wire covering it is used as a coaxial energy transmitting means, but the present invention is not to be limited to this. The means may be feasibly realized so long as it takes the form of a cable-shaped structure in which the electrode corresponding to the core wire 521 and the electrode corresponding to the armoring metal 524 are set with the dielectric 523, and such a means will produce the same effect as in the above embodiment.

As described above, according to the fifth embodiment of the present invention, a laser apparatus is divided into two parts, one being a power source/switch block comprised of a high-voltage power source and a switch and the other being a laser oscillating block having a discharge block, and these two parts are connected by an energy transmitting means made of flat plates (conductor), or a coaxial energy transmitting means or a plate-shaped capacity/energy transmitting means constructed as one circuit component part performing the combined functions of a charging capacitor (pulse generating capacitor) and a connecting conductor, all of which are respectively designed to achieve a reduction of inductance. Thus, the construction of the apparatus proposed herein can form a circuit with small inductance, achieving a reduction of the rise-up time of large-current pulses, improving the laser efficiency, and also increasing the degree of freedom in the layout of the component parts, and, in addition, as the construction herein proposed performs the combined functions of a capacitor part and conductor, it produces the effect that the apparatus can be manufactured at low costs.

Figure 23:
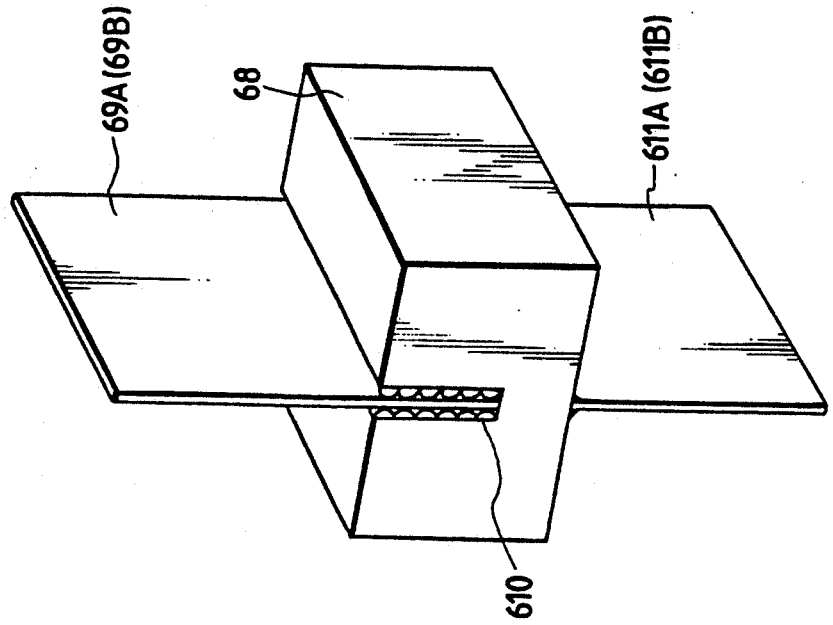
FIG. 23 is a view showing an attaching/detaching part shown in FIG. 22.
Figure 22:
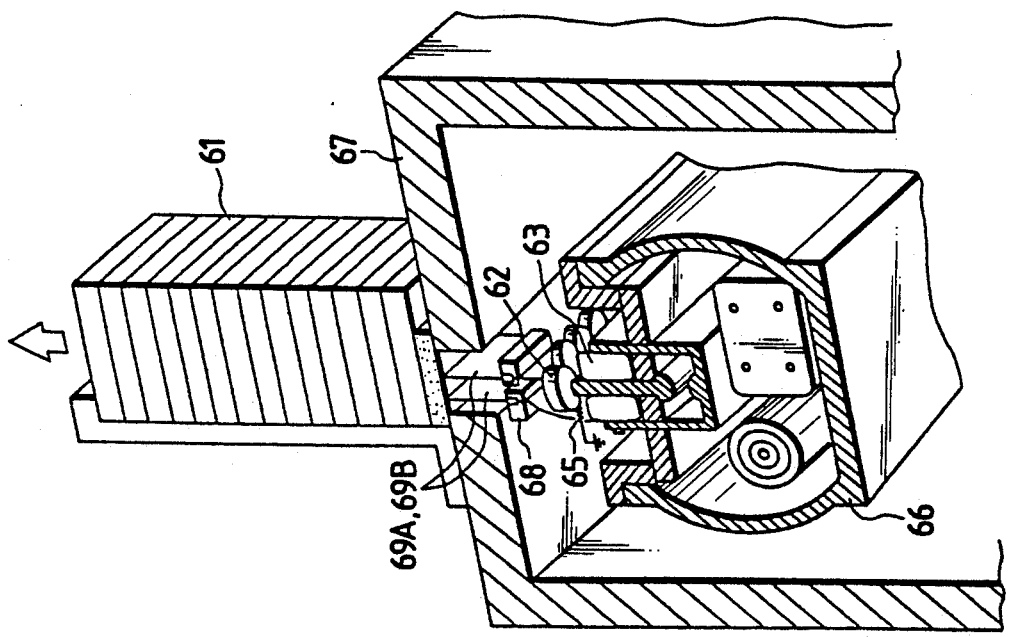
FIG. 22 is a sectional view showing a laser apparatus according to a sixth embodiment of the present invention.

A sixth embodiment of the present invention will be described with reference to FIGS. 22 and 23. In FIG. 22, reference number 67 indicates a chamber base which contains a discharge block 66 and has the switch 61 installed thereon. Reference number 68 indicates a supporting base for attaching/detaching part into which conductive pieces 69A and 69B led out of the switch 61 are inserted. FIG. 23 illustrates the construction of the details of the supporting base for attaching/detaching part 68. Reference number 610 indicates a contact spring which holds the conductive pieces 69A and 69B in contact under pressure and reference numbers 611A and 611B indicate lead pieces led out of the discharge block 66 and these are fixed on the supporting base 68 to form an integrated structure therewith.

Next, the operations of the apparatus will be described. A description of the electrical operations performed by the laser apparatus is omitted here as such operations are the same as those by the prior art, and the construction of the apparatus will be described below. As illustrated in FIG. 22, the switch 61 and the discharge block 66 are separated, and the switch 61 is rigidly fixed on the chamber base 67. At this moment, the conductive pieces 69A and 69B as terminals provided on the lower end of the switch 61, are inserted into the contact spring 610 in the supporting base 68. It is an important condition for the switch 61, which is to control a high voltage and a large current, that the switch is readily detachable or replaceable at all times for such reasons as a failure or an inspection. In this case, the attachment and detachment of the switch 61 is done by pulling out the conductive pieces 69A and 69B provided on the switch 61 in the direction indicated by the arrow. The contact spring 610 makes a strong and firm contact because of functional reasons relevant to the conduction of a large current. Moreover, the switch 61 is fixed to the chamber base 67 mechanically with screws or the like after the conductive pieces 69A and 69B are inserted under pressure from an upper position into the contact spring 610.

Figure 24:
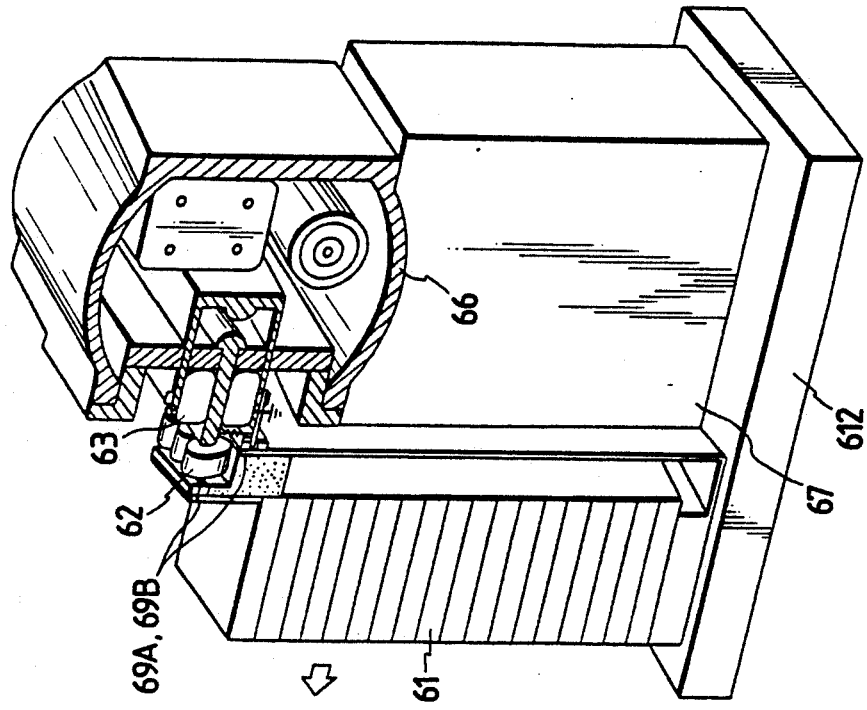

FIG. 24 illustrates a modified embodiment of the sixth embodiment of the present invention. Reference number 612 indicates a foundation which rigidly fixes the chamber base 67. The construction shown in FIG.

24 is provided with the switch 61 on the side of the discharge block 66 and provided with the conductive pieces 69A and 69B at the side of the discharge block 66. The attachment and detachment is done by pulling out the switch 61 in the direction indicated by the arrow.

Figure 25:
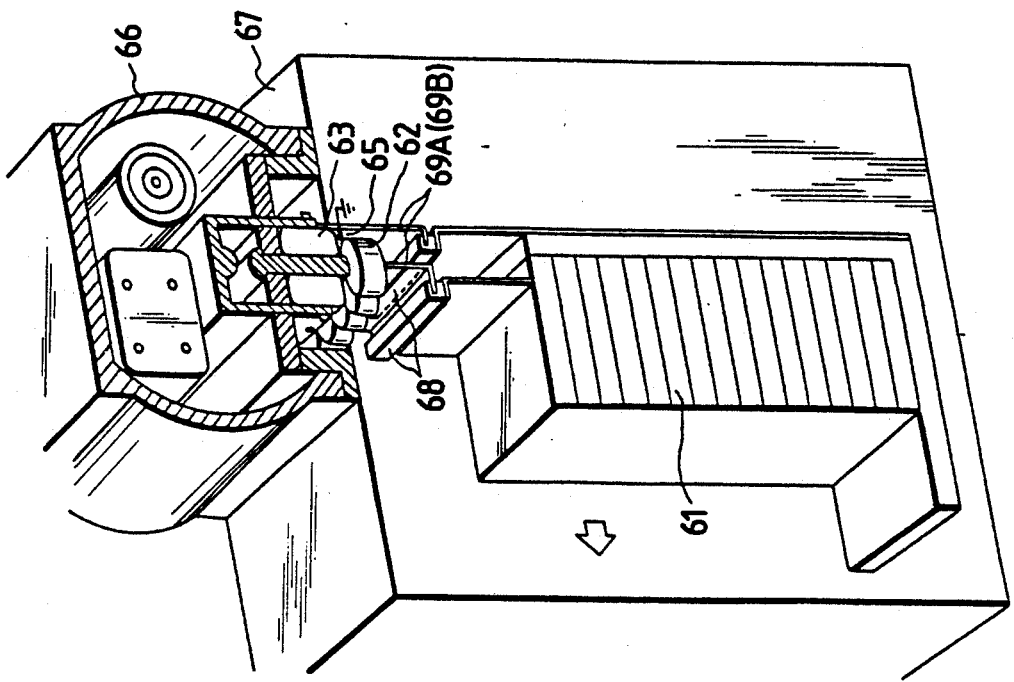
FIG. 24 and FIG. 25 are respectively sectional views illustrating a laser apparatus in modified embodiments of the sixth embodiment of the present invention.

FIG. 25 shows a construction in which the switch 61 held in its posture suspended from the discharge block 66 is arranged below the discharge block 66. With the conductive pieces 69A and 69B provided in an area below the discharge block 66, the attachment and detachment of the switch 61 is done by pulling out the support base 68 for attaching/detaching part in the direction indicated by the arrow.

As described above, according to the sixth embodiment of the present invention, the supporting base for attaching/detaching part and conductive pieces are formed as separate structures, with the supporting base and the conductive pieces being provided in pairs on the switch and the discharge block, in such a manner as to permit their detachment as necessary, so that the construction proposed in the present invention attains the effect that the parts mentioned above can be attached/detached easily for the maintenance, inspection, repair, and replacement of the switch.

What is claimed is:

1. A discharge-excited laser apparatus in which gas located in a discharge space between two electrodes is excited by an applied voltage to produce a laser beam, said apparatus, comprising:
   a pair of discharge electrodes extending in a direction of an optical axis of said laser apparatus;
   a plurality of peaking capacitors arranged in parallel in a longitudinal direction of said pair of discharge electrodes; and
   a plurality of semiconductor switches arranged in a plane in a longitudinal direction of said discharge electrodes and connected in series and in parallel to said peaking capacitors so as to transfer electric charge to said peaking capacitors for applying said voltage to said electrodes to produce said laser beam.

2. Discharge-excited laser apparatus in which gas located in a discharge space between two electrodes is excited by an applied voltage to produce a laser beam, said apparatus, comprising:
   at least one pair of discharge electrodes; and
   a switch through which a discharge energy is transmitted to a space between said discharge electrodes to produce said laser beam;
   wherein said switch includes two or more solid switching elements and said switching elements are installed on both sides of a virtual line drawn to pass through said pair of discharge electrodes and crossing an optical axis of said laser apparatus at a right angle.

3. A discharge-excited laser apparatus in which gas located in a discharge space between two electrodes is excited by an applied voltage to produce a laser beam, said apparatus, comprising:
   at least a pair of discharge electrodes; and
   a switch block for transmitting a discharged energy to a space between said discharge electrodes to produce said laser beam;
   wherein said switch block includes a plurality of switches set in multiple stages and conductive plates, said switch block is positioned on a virtual line drawn in such a manner as to pass through said discharge electrodes and crossing a laser optical axis at a right angle, and said switch block is arranged in parallel to a longitudinal direction of said discharge electrodes.

4. A discharge-excited laser apparatus in which gas located in a discharge space between two electrodes is excited by an applied voltage to produce a laser beam, said apparatus, comprising:
   a switch for releasing energy accumulated in a charging capacitor so that a voltage is applied to said electrodes to produce laser oscillation and thus a laser beam, said switch including solid element switches and cooling fins alternately stacked to form a sandwich-shaped structure, and electrode terminals on obverse and reverse surfaces of said solid element switches stacked above and below though said cooling fins being connected with each other in series;
   a discharge block for generating said laser beam, said discharge block being formed into a structure integrated with said switch unit placed on an upper surface of said discharge block; and
   a strut wall provided with a plurality of conductors connecting terminals of said discharge block and output terminals of said switch.

5. A discharge-excited laser apparatus in which gas located in a discharge space between two electrodes is excited by an applied voltage to produce a laser beam, said apparatus, comprising:
   a switch for releasing the energy accumulated in a charging capacitor so that a voltage is applied to said electrodes to produce laser oscillation and thus a laser beam, said switch including solid element switches set upright on a switch barrel, electrode terminals on obverse and reverse surfaces of said solid element switches being connected in series with each other via short-circuiting bars, and a plural number of rows of said solid element switches being connected in series with each other via short-circuiting bars, and a plural number of rows of said solid element switches thus connected in series being further connected in parallel;
   a discharge block for generating a laser beam, said discharge block being formed into a structure integrated with said switch placed on an upper surface of said discharge block; and
   a plurality of conductors produced on said switch barrel, said conductors connecting terminals of said discharge block and output terminals of said switch.

6. A discharge-excited laser apparatus in which gas located in a discharge space between two electrodes is excited by an applied voltage to produce a laser beam, said apparatus comprising:
   a power source/switch block including a high-voltage power source which applies a high voltage necessary for generation of pulses for laser output and a switch which, being connected in parallel to said high-voltage power source, promotes discharge of electric energy accumulated in a charging capacitor so that said voltage is applied to said electrodes to produce laser oscillation and thus a laser beam;
   a laser oscillating block having a discharge block which generates a laser beam by discharging energy accumulated in a peaking capacitor charged with the energy shifted from said charging capacitor; and an energy transmitting means for forming connections between high-voltage output terminal of said power source/switch block and terminals of said charging capacitor in said laser oscillating block and between a ground terminal of said power source/switch block and a ground terminal of said laser oscillating block.

7. A discharge-excited laser apparatus, in which gas located in a discharge space between two electrodes is excited by an applied voltage to produce a laser beam, said apparatus, comprising:

a power source/switch block including a high-voltage power source which applies a high voltage necessary for generation of pulses for laser output and a switch which, being connected in parallel to said high-voltage power source, promotes discharge of electric energy accumulated in a charging capacitor so that said voltage is applied to said electrodes to produce laser oscillation and thus a laser beam;

a laser oscillating block having a discharge block which generates a laser beam by discharging energy accumulated in a peaking capacitor charged with the energy shifted from said charging capacitor; and a coaxial energy transmitting means which concurrently serves as a charging capacitor and a connecting conductor between said power source/switch block and said laser oscillating block, said coaxial energy transmitting means including a core wire, a dielectric covering a circumference of said core wire and an armoring metal covering a circumference of said dielectric.

8. A discharge-excited laser apparatus, in which gas located in a discharge space between two electrodes in excited by an applied voltage to produce a laser beam, said apparatus, comprising:

a power source/switch block including a high-voltage power source which applies a high voltage necessary for generation of pulses for laser output and a switch which, being connected in parallel to said high-voltage power source, promotes discharge of electric energy accumulated in a charging capacitor so that said voltage is applied to said electrodes to produce laser oscillation and thus a laser beam;

a laser oscillating block having a discharge block which generates a laser beam by discharging energy accumulated in a peaking capacitor charged with the energy shifted from said charging capacitor; and a plate-shaped capacity/energy transmitting means which serves concurrently as a charging capacitor and a connecting conductor between said power source/switch block and said laser generating block, said transmitting means including flat plates joined under pressure with a dielectric set between them.

9. A discharge-excited laser apparatus in which gas located in the discharge space between two electrodes is excited by an applied voltage to produce a laser beam, said apparatus, comprising:

a switch which promotes discharge of energy accumulated in a charging capacitor;

a discharge block constructed separately from said switch and performing laser oscillation by starting a discharge when said switch is turned on, so that said voltage is applied to said electrodes to produce laser oscillation and thus a laser beam;

a supporting base for an attaching/detaching part, which connects two terminals of said switch and said discharge block in a manner permitting their free attachment and detachment; and a conductive piece led out from said switch, said conductive piece being pressed with a contact spring provided in said supporting base.

* * * * *